United States Patent
He (10) Patent No.: US 9,935,800 B1
(45) Date of Patent: Apr. 3, 2018

(54) REDUCED COMPLEXITY PRECOMPUTATION FOR DECISION FEEDBACK EQUALIZER

(71) Applicant: Credo Technology Group Limited, Grand Cayman (KY)

(72) Inventor: Runsheng He, Sunnyvale, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 15/285,272

(22) Filed: Oct. 4, 2016

(51) Int. Cl.
*H04L 27/01* (2006.01)
*H04B 14/02* (2006.01)

(52) U.S. Cl.
CPC ........... *H04L 27/01* (2013.01); *H04B 14/023* (2013.01); *H04B 14/026* (2013.01)

(58) Field of Classification Search
CPC . H03H 7/30; H03H 7/40; H03K 5/159; H04B 10/00; H04B 10/06; H04B 10/60;
(Continued)

(56) References Cited

U.S. PATENT DOCUMENTS

| | | | |
|---|---|---|---|
| 5,420,587 A | 5/1995 | Michel | |
| 5,936,566 A | 8/1999 | Park | |

(Continued)

OTHER PUBLICATIONS

"U.S. Non-final Office Action", dated Apr. 23, 2014, U.S. Appl. No. 13/594,595, "High-Speed Parallel Decision Feedback Equalizer," filed Aug. 24, 2012, 13 pgs.

"U.S. Final Office Action", dated Jul. 27, 2012, U.S. Appl. No. 12/565,817, "Parallel Viterbi Decoder with End-State Information Passing", filed Sep. 24, 2009, 25 pgs.

"U.S. Non-final Office Action", dated Nov. 17, 2014, U.S. Appl. No. 13/594,595, "High-Speed Parallel Decision Feedback Equalizer," filed Aug. 24, 2012, 11 pgs.

(Continued)

*Primary Examiner* — Shawkat M Ali
(74) *Attorney, Agent, or Firm* — Ramey & Schwaller, LLP (57) ABSTRACT

Techniques for reducing the complexity and power requirements of precompensation units, as well as equalizers, devices, and systems employing such techniques. In an illustrative method for providing high speed equalization, the method comprises: obtaining a channel response that presents trailing intersymbol interference in a signal having a sequence of symbols from a symbol set; determining a distribution of threshold values for a precompensation unit corresponding to said channel response with said symbol set; deriving a reduced set of threshold values from said distribution; and implementing a decision feedback equalizer with a reduced-complexity precompensation unit employing the reduced set of threshold values. In a related illustrative method for providing high speed equalization, the method comprises: obtaining a channel response that presents trailing intersymbol interference in a signal having a sequence of symbols from a symbol set, the channel response and symbol set corresponding to an initial distribution of threshold values for a precompensation unit; deriving a filter that converts the channel response into a modified channel response, the modified channel response and symbol set corresponding to an improved distribution of threshold values in that the improved distribution includes fewer distinct threshold values or reduced spacing between at least some adjacent threshold values; and implementing a decision feedback equalizer with a reduced-complexity precompensation unit employing the threshold values in the improved distribution.

26 Claims, 6 Drawing Sheets

(58) Field of Classification Search
CPC ....... H04B 14/023; H04B 14/026; H04L 1/00;
H04L 7/00; H04L 25/02; H04L 25/03;
H04L 27/01; H04L 27/06
USPC ......... 375/219, 229–233, 295, 316; 398/158,
398/202, 208, 209
See application file for complete search history.

(56) References Cited

U.S. PATENT DOCUMENTS

| | | | |
|---|---|---|---|
| 6,002,356 A | 12/1999 | Cooper | |
| 6,192,072 B1 | 2/2001 | Azadet et al. | |
| 7,239,652 B2 | 7/2007 | Parhi | |
| 7,333,580 B2 | 2/2008 | Parhi | |
| 7,505,695 B2 | 3/2009 | Sugihara et al. | |
| 7,522,899 B1 | 4/2009 | He | |
| 7,574,146 B2 | 8/2009 | Chiang et al. | |
| 7,577,892 B1 | 8/2009 | He | |
| 7,646,833 B1 | 1/2010 | He et al. | |
| 7,684,778 B1 | 3/2010 | Qian et al. | |
| 7,688,968 B1 | 3/2010 | Chen et al. | |
| 7,733,246 B2 | 6/2010 | Feng et al. | |
| 7,773,017 B1 | 8/2010 | He et al. | |
| 7,813,702 B1 | 10/2010 | He | |
| 7,826,576 B1 | 11/2010 | He et al. | |
| 7,853,855 B1 | 12/2010 | He | |
| 7,933,341 B2 | 4/2011 | Agazzi et al. | |
| 7,987,396 B1 | 7/2011 | Riani et al. | |
| 7,999,711 B1 | 8/2011 | He et al. | |
| 8,023,920 B1 | 9/2011 | Qian et al. | |
| 8,031,765 B1 | 10/2011 | He | |
| 8,059,773 B1 | 11/2011 | He et al. | |
| 8,077,859 B1 | 12/2011 | Xiaopeng et al. | |
| 8,175,565 B1 | 5/2012 | He et al. | |
| 8,184,802 B1 | 5/2012 | Xiaopeng et al. | |
| 8,203,975 B1 | 6/2012 | Chen et al. | |
| 8,276,052 B1 | 9/2012 | Riani et al. | |
| 8,301,036 B2 | 10/2012 | He | |
| 8,699,558 B1* | 4/2014 | Wang | H04L 25/03057 375/233 |
| 8,971,396 B1* | 3/2015 | Bates | H04L 25/03057 375/229 |
| 9,071,479 B2 | 6/2015 | Qian et al. | |
| 9,571,309 B1* | 2/2017 | Sakai | H04L 25/03006 |
| 9,667,454 B1* | 5/2017 | Koba | H04L 25/03063 |
| 9,699,007 B2* | 7/2017 | Ho | H04L 25/03057 |
| 2002/0007474 A1 | 1/2002 | Fujita et al. | |
| 2003/0108113 A1 | 6/2003 | He et al. | |
| 2003/0123579 A1 | 7/2003 | Safavi et al. | |
| 2004/0196017 A1 | 10/2004 | Sutardja et al. | |
| 2005/0190868 A1 | 9/2005 | Khandekar et al. | |
| 2005/0259766 A1* | 11/2005 | Chen | H03M 13/3961 375/341 |
| 2007/0063882 A1 | 3/2007 | Feng et al. | |
| 2007/0067704 A1 | 3/2007 | Altintas et al. | |
| 2008/0253438 A1 | 10/2008 | Riani et al. | |
| 2009/0010320 A1* | 1/2009 | Hollis | H03K 3/356113 375/232 |
| 2010/0098042 A1 | 4/2010 | Dent | |
| 2011/0116806 A1 | 5/2011 | He | |
| 2011/0069791 A1 | 11/2011 | He | |
| 2012/0027074 A1 | 2/2012 | Raghavan et al. | |
| 2012/0207247 A1 | 8/2012 | Cheng | |
| 2015/0312056 A1* | 10/2015 | Zhang | H04L 25/0212 375/233 |
| 2016/0065396 A1* | 3/2016 | Chan | H04L 25/03057 375/233 |
| 2016/0182259 A1* | 6/2016 | Musah | H04L 7/0058 375/233 |

OTHER PUBLICATIONS

"U.S. Non-Final Office Action", dated Jan. 30, 2012, U.S. Appl. No. 12/565,817, "Parallel Viterbi Decoder with End-State Information Passing", filed Sep. 24, 2009, 23 pgs.

"U.S. Non-Final Office Action", dated Sep. 11, 2012, U.S. Appl. No. 13/027,625, "High-Speed Flash Analog to Digital Converter", filed Feb. 15, 2011, 8 pgs.

"U.S. Notice of Allowability", dated Jun. 26, 2012, U.S. Appl. No. 12/618,735, "High-Speed Adaptive Decision Feedback Equalizer", filed Nov. 15, 2009, 4 pgs.

Black, Peter J. et al., "A 1-Gb/s, Four-State, Sliding Block Viterbi Decoder", IEEE Journal of Solid-State Circuits, vol. 32, No. 6, Jun. 1997, pp. 797-805.

Greshishchev, Yuriy M. et al., "A 40GS/s 6b ADC in 65nm CMOS", ISSCC 2010/Session 21/Successive-Approximation ADCs/21.7, 2010 IEEE International Solid-State Circuits Conference,390-392.

* cited by examiner

REDUCED COMPLEXITY PRECOMPUTATION FOR DECISION FEEDBACK EQUALIZER

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and binary '1' by another symbol (e.g., an electrical voltage or current signal within a second range), but higher-order signal constellations are known and frequently used. In 4-level pulse amplitude modulation (PAM4), each symbol interval may carry any one of four symbols, denoted as −3, −1, +1, and +3. Two binary bits can thus be represented by each symbol.

Channel non-idealities produce dispersion which may cause each symbol to perturb its neighboring symbols, causing intersymbol interference (ISI). ISI can make it difficult for the receiving device to determine which symbols were sent in each interval, particularly when such ISI is combined with additive noise.

To combat noise and ISI, receiving devices may employ various equalization techniques. Linear equalizers generally have to balance between reducing ISI and avoiding noise amplification. Decision Feedback Equalizers (DFE) are often preferred for their ability to combat ISI without inherently requiring noise amplification. As the name suggests, a DFE employs a feedback path to remove ISI effects derived from previously-decided symbols.

A standard textbook implementation of a DFE employs a number of cascaded circuit elements to generate the feedback signal and apply it to the received input signal, all of which must complete their operation in less than one symbol interval. At a symbol interval of 100 picoseconds (for a symbol rate of 10 GSymbol/s), this implementation is very challenging with currently available silicon semiconductor processing technologies. Even data rates around a few gigabits per second can be difficult to achieve due to performance limitations of silicon-based integrated circuits.

Accordingly, certain proposed designs such as those disclosed in U.S. Pat. No. 8,301,036 ("High-speed adaptive decision feedback equalizer") and U.S. Pat. No. 9,071,479 ("High-speed parallel decision feedback equalizer") employ alternative implementations that exploit the use of precomputation modules. The inventor has discovered that in many cases the complexity and power requirements of such modules are excessive, constituting a dominant fraction (>80%) of the areal and power requirements for the receiving device.

SUMMARY

Accordingly, there are disclosed herein techniques for reducing the complexity and power requirements of precompensation units, as well as equalizers, devices, and systems employing such techniques. In an illustrative method for providing high speed equalization, the method comprises: obtaining a channel response that presents trailing intersymbol interference in a signal having a sequence of symbols from a symbol set; determining a distribution of threshold values for a precompensation unit corresponding to said channel response with said symbol set; deriving a reduced set of threshold values from said distribution; and implementing a decision feedback equalizer with a reduced-complexity precompensation unit employing the reduced set of threshold values. In a related illustrative method for providing high speed equalization, the method comprises: obtaining a channel response that presents trailing intersymbol interference in a signal having a sequence of symbols from a symbol set, the channel response and symbol set corresponding to an initial distribution of threshold values for a precompensation unit; deriving a filter that converts the channel response into a modified channel response, the modified channel response and symbol set corresponding to an improved distribution of threshold values in that the improved distribution includes fewer distinct threshold values or reduced spacing between at least some adjacent threshold values; and implementing a decision feedback equalizer with a reduced-complexity precompensation unit employing the threshold values in the improved distribution.

An illustrative channel interface module comprises a receiver having: a front end filter that reduces leading intersymbol interference in (and preferably shortens the channel response of) the receive signal to produce a filtered signal having trailing intersymbol interference in a sequence of symbols from a symbol set, the trailing intersymbol interference and symbol set corresponding to a set of threshold values for a conventional precompensation unit; at least one reduced-complexity precompensation unit that produces at each of multiple time intervals a set of tentative decisions, each tentative decision accounting for a degree of trailing intersymbol interference from an assumed sequence of preceding symbol decisions; a selection element selects from the sets of tentative decisions a sequence of symbol decisions based on preceding symbol decisions; and a device interface that provides a host node with a received data stream derived from the sequence of symbol decisions.

Each of the foregoing embodiments may be implemented individually or in combination, and together with any one or more of the following features in any suitable combination: (1) said deriving includes: identifying groups of threshold values within said distribution; and combining the threshold values in each group to obtain a replacement threshold value for that group. (2) said replacement threshold value is an average of threshold values for that group. (3) said replacement threshold value is a center of a range of threshold values for that group. (4) said identifying groups includes determining group membership based at least in part on a difference between each threshold value and a replacement threshold value. (5) a magnitude of said difference is maintained at or below a predetermined limit. (6) the limit is 10% of a minimum interval between symbols in the symbol set. (7) said employing includes deriving a reduced set of threshold values from said distribution. (8) the front end filter shapes a spectrum of the filtered signals to provide, relative to the spectrum of optimally filtered signals, fewer distinct threshold values or reduced spacing between at least some adjacent threshold values in the set. (9) the at least one reduced-complexity precompensation unit comprises a single comparator for each threshold value in a reduced set of threshold values, the reduced set having fewer unique threshold values than said set of threshold values for a conventional precompensation unit. (10) the set of threshold values for a conventional precompensation unit includes groups of threshold values, and wherein the at least one reduced-complexity precompensation unit employs a single replacement threshold value for the threshold values in each said group. (11) the module includes a sensor that converts a channel signal into the receive signal. (12) the channel signal is an optical signal. (13) the channel is an information storage medium. (14) the channel signal is an electromagnetic signal conveyed via twisted wire pair, coaxial cable, or backplane transmission lines. (15) the module includes a forward error correction encoder that derives the received data stream from the sequence of symbol decisions. (16) the obtained channel response has an initial spectrum and deriving said filter includes at least approximately matching a modified channel response spectrum to the initial spectrum.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

DETAILED DESCRIPTION

Figure 1:
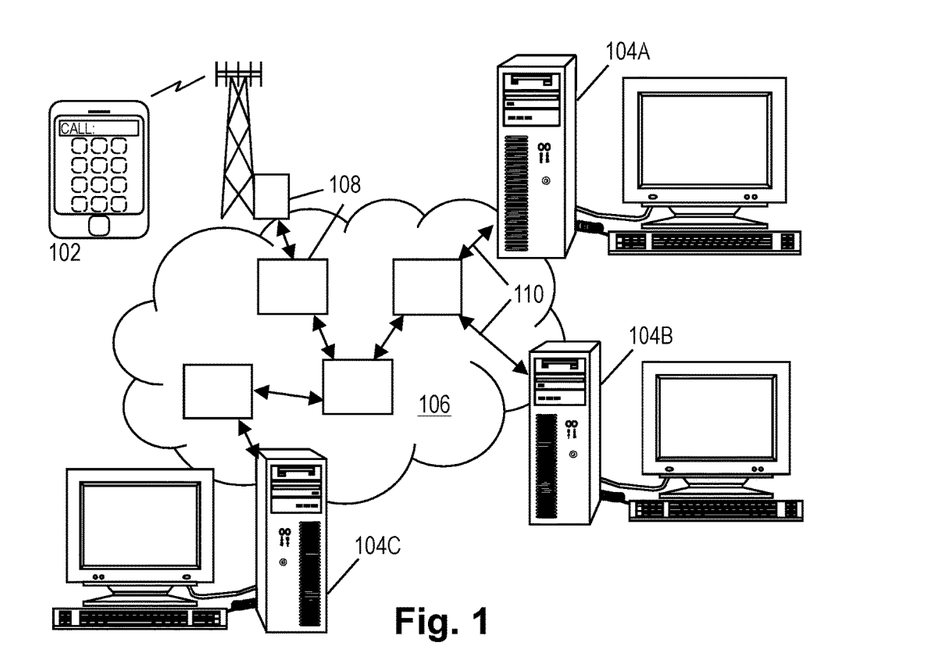
FIG. 1 shows an illustrative computer network.

The disclosed apparatus and methods are best understood in the context of the larger environments in which they operate. Accordingly, FIG. 1 shows an illustrative communications network 100 including mobile devices 102 and computer systems 104A-C coupled via a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
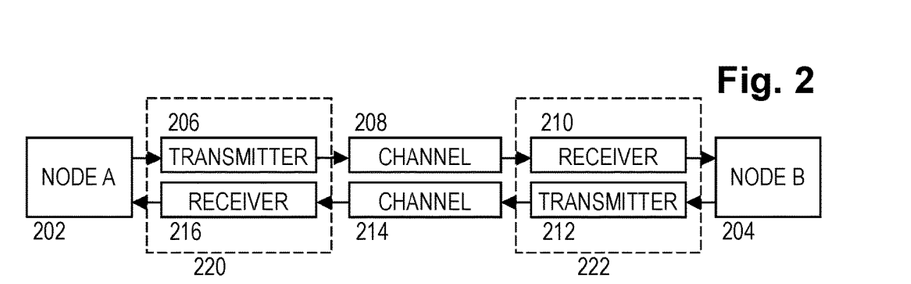
FIG. 2 is a function-block diagram of an illustrative point-to-point communication link.

FIG. 2 is a diagram of an illustrative point-to-point communication link that may be representative of links 110 in FIG. 1. The illustrated embodiment includes a first node 202 ("Node A") in communication with a second node 204 ("Node B"). Nodes A & B can each be, for example, any one of mobile devices 102, equipment items 108, computer systems 104A-C, or other sending/receiving devices suitable for high-rate digital data communications.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, backplane transmission lines, and wireless communication links. (It is also possible for the channel to be a magnetic or optical information storage medium, with the write-read transducers serving as transmitters and receivers.) Bidirectional communication between Node A and Node B can be provided using separate channels 208 and 214, or in some embodiments, a single channel that transports signals in opposing directions without interference.

A transmitter 206 of the transceiver 220 receives data from Node A and transmits the data to the transceiver 222 via a signal on the channel 208. The channel signal may be, for example, an electrical voltage, an electrical current, an optical power level, a wavelength, a frequency, or a phase value. A receiver 210 of the transceiver 222 receives the signal via the channel 208, uses the signal to reconstruct the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to reconstruct the transmitted data, and provides the data to Node A.

Figure 3:
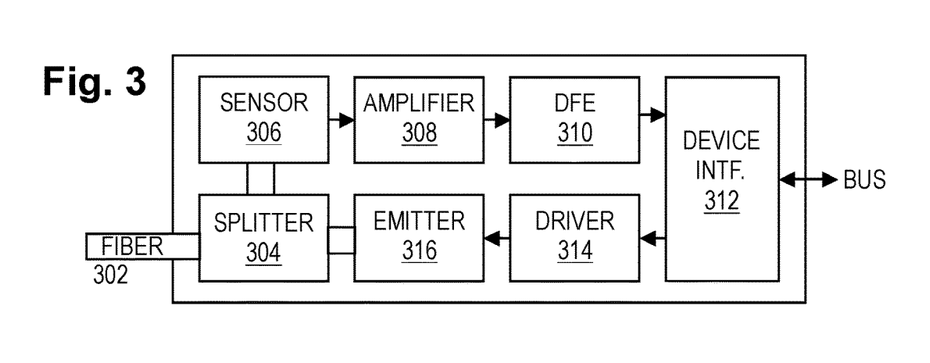
FIG. 3 is a function-block diagram of an illustrative fiber optic interface module.

FIG. 3 illustrates a transceiver embodiment specific to fiber optic signaling with a function block diagram of an illustrative fiber optic interface module. The optical fiber 302 couples to a splitter 304 which creates two optical paths to the fiber: one for receiving and one for transmitting. A sensor 306 is positioned on the receiving path to convert one or more received optical signals into corresponding analog (electrical) receive signals that are amplified by amplifier 308 in preparation for processing by a decision feedback equalizer (DFE) 310. The DFE 310 converts the received signal into a sequence of symbol decisions. A device interface 312 buffers the sequence of symbol decisions and, in at least some embodiments, includes forward error correction (FEC) decoding and payload extraction logic to derive a received data stream from the sequence of symbol decisions. The device interface 312 then makes the received data stream available to the host node via an internal data bus in accordance with a standard I/O bus protocol.

Conversely, data for transmission can be communicated by the host node via the bus to device interface 312. In at least some embodiments, the device interface 312 packetizes the data with appropriate headers and end-of-frame markers, optionally adding a layer of FEC coding and/or a checksum. Driver 314 accepts a transmit data stream from interface 312 and converts the transmit data stream into an analog electrical drive signal for emitter 316, causing the emitter to generate optical channel signals that are coupled via splitter 304 to the optical fiber 302.

Figure 4:
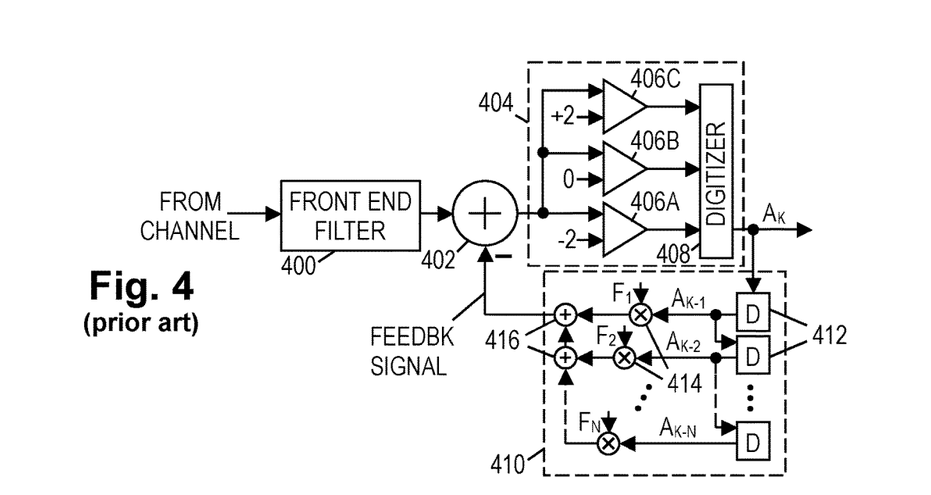
FIG. 4 shows an illustrative textbook decision feedback equalizer (DFE) implementation.

As previously mentioned, a DFE is included in the receive chain to combat intersymbol interference (ISI) that results from signal dispersion in the channel. FIG. 4 shows an illustrative "textbook" implementation of a DFE. In FIG. 4, an analog or digital front end filter 400 operates on the receive signal to shape the overall channel response of the system and minimize the effects of leading ISI on the current symbol. As part of the shaping of the overall channel response, the front end filter 400 may also be designed to shorten the channel response of the filtered signal and (as explained below) reduce a number of precomputation module comparator thresholds while minimizing any attendant noise enhancement. A summer 402 subtracts a feedback signal from the output of the front end filter 400 to minimize the effects of trailing ISI on the current symbol.

A decision element 404 then digitizes the combined signal to produce a stream of output data (denoted $A_k$, where k is the time index). In the illustrated example, the symbols are presumed to be PAM4 (−3, −1, +1, +3), making the decision thresholds −2, 0, and +2 for comparators 406A-406C, respectively. (The unit for expressing symbol and threshold values is omitted for generality, but for explanatory purposes may be presumed to be volts. In practice, a scale factor will be employed.) An optional digitizer 408 converts the comparator outputs into a binary number representation, e.g., 00 to represent −3, 01 to represent −1, 10 to represent +1, and 11 to represent +3. Alternatively, a Gray-coded representation may be employed.

The DFE generates the feedback signal with a feedback filter 410 having a series of delay elements 412 (e.g., latches, flip flops, or registers) that store the recent output symbol decisions ($A_{k-1} \ldots A_{k-N}$, where N is the number of filter coefficients $f_i$). A set of multipliers 414 determines the product of each symbol with a corresponding filter coefficient, and a series of summers 416 combines the products to obtain the feedback signal.

As an aside, we note here that the circuitry for the front end filter 400 and the feedback filter 410 can operate on analog signals, or conversely, it can be implemented using digital circuit elements and/or software in a programmable processor. Further, a timing recovery unit and a filter coefficient adaptation unit augment the operation of the DFE, but such considerations are addressed in the literature and known to those skilled in the art, so we will not dwell on them here.

In the embodiment of FIG. 4, the feedback filter 410 must complete its operation in less than one symbol interval because its output depends in part upon the immediately preceding decision. At very high data rates, one symbol interval does not provide sufficient time to finish the filter multiplications and the feedback subtraction. Accordingly, one solution that has been proposed in the literature is "unrolling" the feedback filter.

Figure 5:
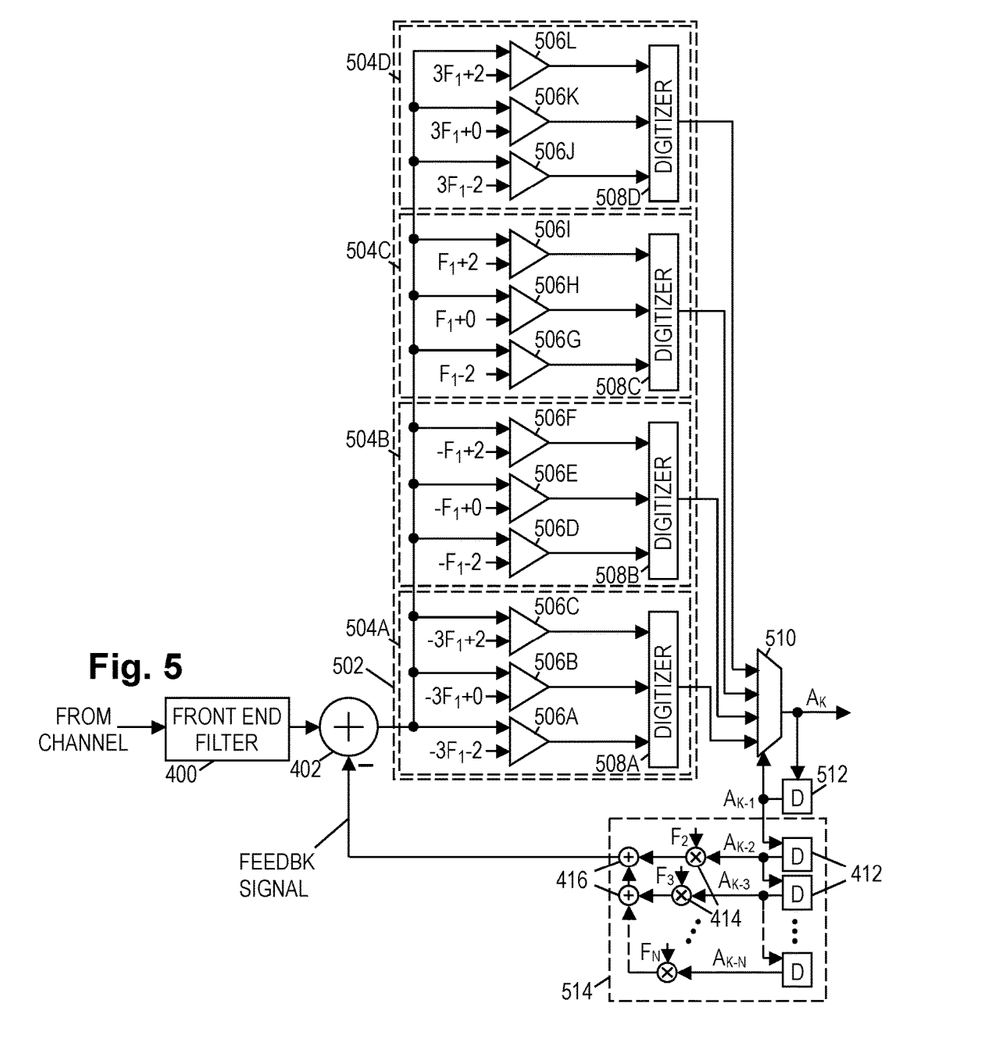
FIG. 5 shows an illustrative DFE employing a one-tap precomputation unit.

FIG. 5 shows an illustrative variation of FIG. 4 that unrolls the feedback filter by one tap. The embodiment of FIG. 5 employs the same front end filter 400, but summer 402 subtracts a feedback signal to remove the trailing ISI caused by all but the immediately preceding symbol. For each possible value of the immediately preceding symbol, the precompensation unit 502 provides a decision element 504A-504D. Decision element 504A speculatively assumes that the preceding symbol was −3, and rather than subtracting the ISI that would result from this symbol (−3*$f_1$, where $f_1$ is the coefficient of the first tap in the textbook feedback filter 410), the thresholds of comparators 506A-506C have been adjusted relative to the thresholds of comparators 406A-406C by adding −3*$f_i$, enabling decision element 504A to form a tentative symbol decision based on this speculative assumption.

Similarly, decision elements 504B, 504C, and 504D employ comparators with suitably adjusted thresholds to render tentative decisions under the speculative assumptions that the preceding symbol was −1, +1, and +3, respectively. The precompensation unit 502 supplies these tentative decisions to a multiplexer 510, which chooses the proper tentative decision based on the immediately preceding symbol decision $A_{k-1}$, which is stored by delay element 512. Feedback filter 514 has a reduced number of taps (filter coefficients), but otherwise operates similarly to feedback filter 410.

Although this unrolling step increases the number of elements in the DFE loop (i.e., in the loop including summer 402, precompensation unit 502, multiplexer 510, delay element 512, and feedback filter 514), only the inner loop (i.e., the loop including multiplexer 510 and delay element 512) need to achieve their operations in less than one symbol interval. The remaining DFE loop elements can take up to two symbol intervals to complete their pipelined operation. If it is still a challenge to complete the feedback filter operation in time, further unrolling can be performed.

Figure 6:
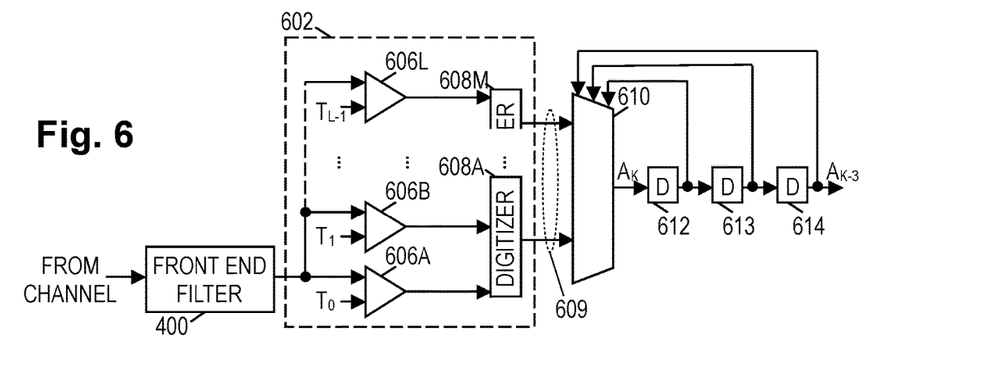
FIG. 6 shows an illustrative DFE with a fully-unrolled precomputation unit.

FIG. 6 shows an illustrative variation in which a 3-tap feedback filter has been completely unrolled. This embodiment still employs front end filter 400, but the summer 402 is eliminated since the feedback filter has been completely unrolled. Its function has been fully supplanted by precompensation unit 602, which provides a separate decision element for each combination of the three preceding symbols. The digitizers 608A-608M supply the tentative decisions 609 to a large multiplexer 610, which selects one tentative decision from the set based on the three preceding symbol decisions held in delay elements 612, 613, 614, thereby producing the sequence of symbol decisions $A_k$.

Where the cardinality of the symbol set is P and the number of feedback filter coefficients is N, the number of decision elements in the precomputation unit 602 is $M=P^N$. Thus, for a PAM4 system (i.e., P=4) with a 3-tap feedback filter, the number of decision elements would be $4^3=64$. As each decision element employs P−1 comparators, the precomputation unit employs $L=(P-1)P^N$ comparators, or 192 comparators for the 3-tap PAM4 DFE example. Thus with each increase in the length of trailing ISI and each increase in symbol set cardinality, the size of the precomputation unit grows exponentially, as does the size of the multiplexer 610.

While such unrolling can address timing constraints on the feedback filter, the operating time required by the inner loop (multiplexer 610 and delay element 612) may become the limiting factor at very high data rates. In other words, for any given semiconductor process, the propagation delay of the multiplexer becomes a bottleneck to the loop-unrolling approach as the data rate increases. U.S. Pat. No. 8,301,036 ("High-speed adaptive decision feedback equalizer") and U.S. Pat. No. 9,071,479 ("High-speed parallel decision feedback equalizer") address this issue with parallelization techniques, which are specifically contemplated for use with the reduced complexity computation units disclosed herein. To that end, the disclosures of these two patents are hereby incorporated herein in their entirety.

Figure 7:
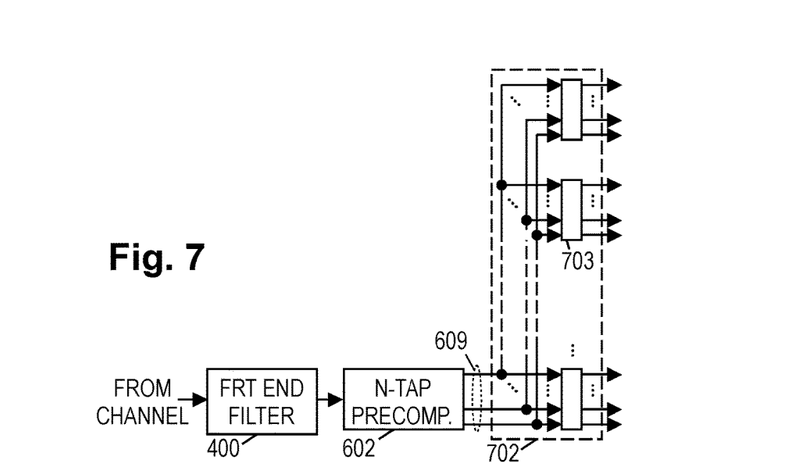
FIG. 7 shows an illustrative DFE front end that produces a parallel array of precomputed signal sets.

Some of these parallelization techniques can be employed by adapting the DFE as illustrated in FIG. 7. The set of tentative decisions 609 provided by the precompensation unit 602 are supplied to a serial-to-parallel converter 702 having a series of registers 703. The registers 703 latch in a round-robin fashion to capture each tentative decision set as it becomes available and to hold it for as long as necessary for subsequent processing, i.e., up to Q symbol intervals, where Q is the number of registers. Other implementations of serial-to-parallel conversion units are known and can be used. Some implementations provide the captured set of tentative decisions as output upon capture, whereas others may store the captured sets to be output simultaneously as a whole group.

Figure 8A:
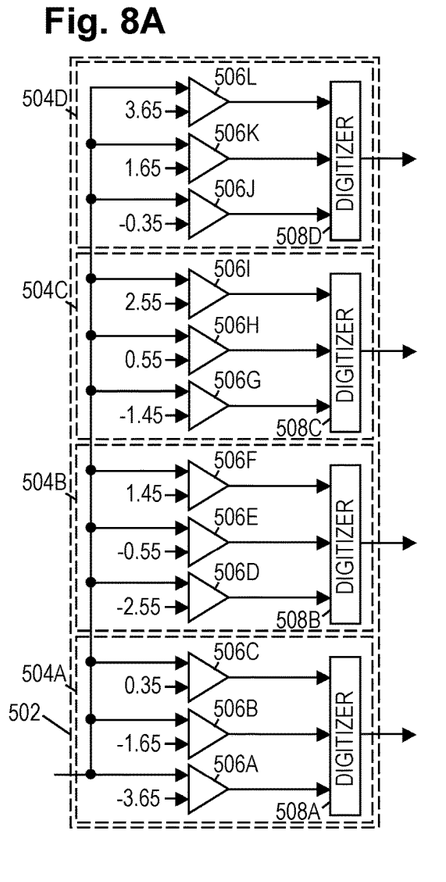
FIG. 8A shows a precomputation unit with illustrative threshold values.
Figure 8B:
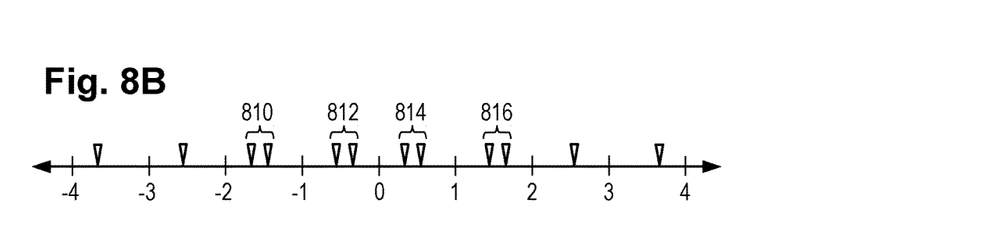
FIG. 8B shows the illustrative threshold values on a number line.

Returning now to the precomputation unit, certain techniques for reducing the complexity of the precomputation unit are now described with respect to specific examples. FIG. 8A shows an illustrative 1-tap PAM4 precomputation unit 502 having 12 computation units and 12 corresponding threshold values for a trailing ISI coefficient of 0.55. FIG. 8B shows these 12 threshold values on a number line. Of particular note is the close correspondence for several of these threshold values. For example, threshold values −1.45 and −1.65 are separated by 0.2, which is only 10% of the interval between symbols. If combined into a single replacement value, e.g., by averaging, the number of threshold values and hence the number of comparators can be reduced. In some contemplated embodiments, the replacement value is a centerpoint of the range of threshold values for that group.

Figure 8C:
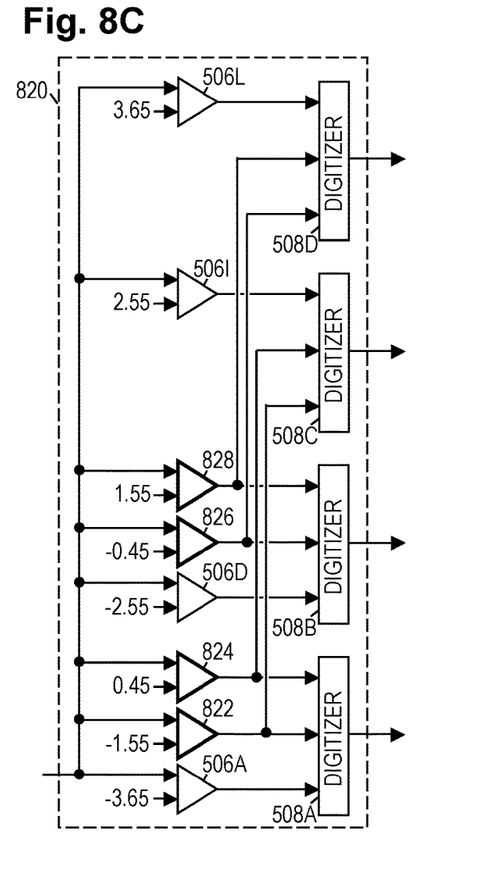
FIG. 8C shows an illustrative reduced-complexity precomputation unit.

FIG. 8B shows four such possible groupings 810, 812, 814, and 816, which are implemented in the precomputation unit 820 of FIG. 8C. Comparing FIGS. 8A and 8C, it is apparent that comparators 506B and 506G have been replaced by a single comparator 822 with a threshold value of −1.55. Comparators 506C and 506H have been replaced by a single comparator 824 with a threshold value of 0.45. Comparators 506E and 506J have been replaced by a single comparator 826 with a threshold value of −0.45. Comparators 506F and 506I have been replaced by a single comparator 828 with a threshold value of 1.55.

In this fashion precomputation unit 820 is obtained, requiring only eight comparators as opposed to twelve for precomputation unit 502. As the adjusted threshold values have shifted by only 0.1 (5% of the interval between symbols), the performance impact is expected to be minimal.

Figure 9:
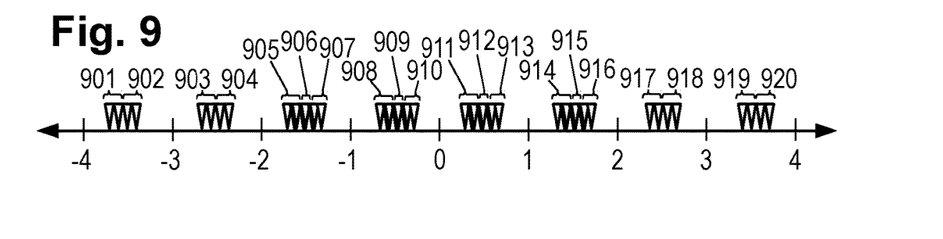
FIG. 9 shows illustrative threshold values for a two-tap PAM4 precomputation unit.

FIG. 9 shows the 48 threshold values for a 2-tap PAM4 precomputation unit of a channel response having trailing ISI coefficients of 0.52 and 0.05. Many of these thresholds differ by only 0.1 or less, offering many opportunities to group threshold values and combine them into a single threshold value that can be accommodated with a single comparator. While different groupings can be employed, the illustrated set of 20 groups reduces the number of required comparators from 48 to 20 without shifting any threshold values by more than 0.05.

Figure 10:
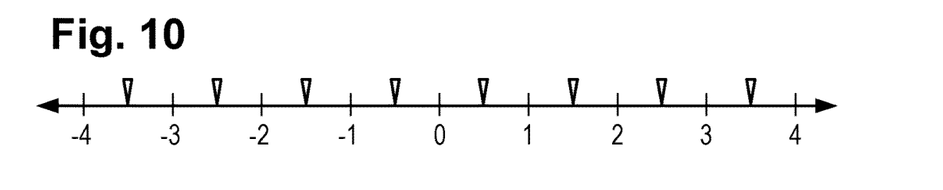
FIG. 10 shows illustrative threshold values for a precomputation unit with a response-shaping filter.

It is further noted that front end filter 400 offers a further opportunity to reduce complexity while minimizing impact on performance. Designers can modify the spectral shaping implemented by filter 400 to account not only for the minimization of leading ISI and shortening of the overall channel response, but also to account for optimizing the feedback filter coefficient values to maximize overlap of the threshold values. For example, if the filter 400 were used to change the coefficient value used for FIG. 8B (0.55) to exactly 0.5, the 12 threshold values would appear as shown in FIG. 10, i.e., with exact overlaps yielding only 8 unique threshold values. In this case, the reduced complexity precomputation unit would cause no adverse impact on performance.

Such overlap is achieved by having the sum of precompensated trailing ISI coefficient values $f_i$ satisfy the following relationship:

$$\sum_{i=1}^{N} c_i f_i = c_0, \quad (1)$$

for some combination of $c_i \in \{-(P-1), \ldots, -1, 0, 1, 2, \ldots (P-1)\}$ with i ranging from 0 to N, excluding the trivial solution for which all $c_i$ are zero. In a 1-tap PAM4 precompensation unit, a suitable trailing ISI coefficient would be, e.g., $f_1 = \pm 1, \pm \frac{1}{2}$.

Figure 11:
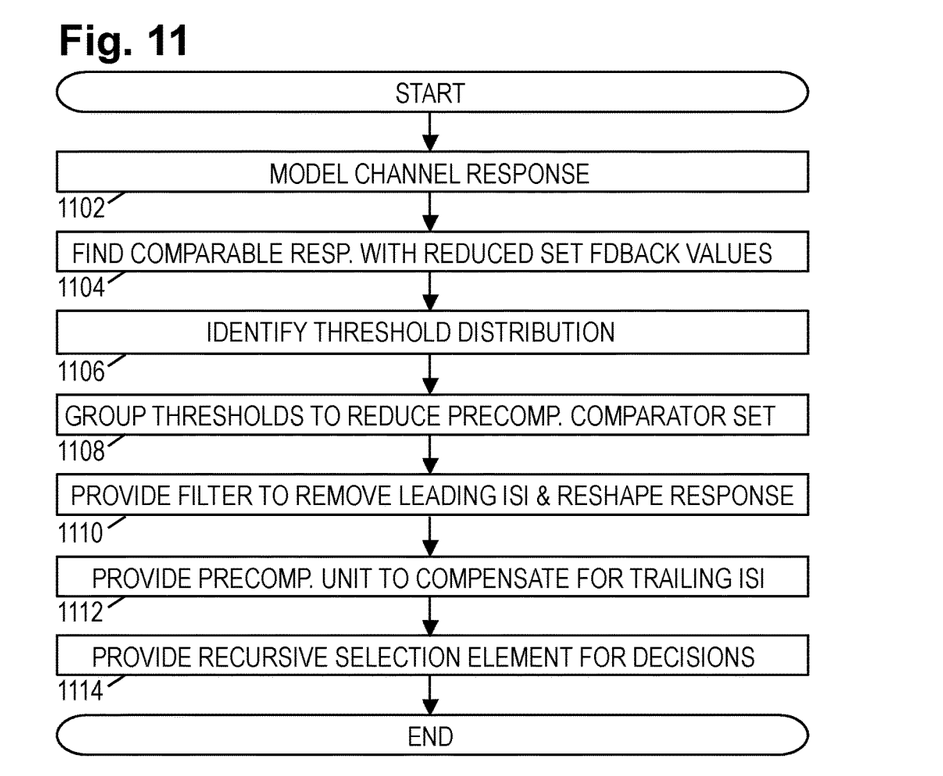
FIG. 11 is a flowchart of an illustrative method for equalizing high speed receiving devices.

FIG. 11 is a flowchart of an illustrative method for providing a high-speed receiving device with DFE-based equalization. It begins in block 1102 with a designer determining a model for the channel response, which may include matched filtering or any other optimal filtering operation by the front end filter 400, which may be designed to yield an initial channel response that is causal, monic, minimum phase response in accordance with techniques known in the literature. (See, e.g., Cioffi et al., "MMSE Decision-Feedback Equalizers and Coding-Part I: Equalization Results", IEEE Trans. Comm., 43(10):2582-2594, November 1995.) Other suitable optimization criteria discussed in the literature include penalties to reduce the length of the filtered channel response and to limit noise enhancement.

In block 1104, the designer determines the spectrum of the channel response and compares it with the spectra of potentially suitable feedback filters satisfying equation (1) and thereby offering a reduced set of threshold values. If a comparable spectrum can be found, e.g., a spectrum with peaks and nulls that align with those of the channel response, the designer optionally adjusts the front end filter 400 so that the channel response matches the selected feedback filter response. Other spectrum matching techniques include minimum mean-square-error matching with and without a penalty for noise enhancement.

In block 1106, the distribution of thresholds for the precompensation unit is determined, and in block 1108 this distribution is reviewed to determine groupings, i.e., each group of thresholds values that can be combined into a single threshold value without requiring undue shifting of any one threshold value in the group.

The manufacturing implementation of the DFE begins in block 1110, with the creation of the desired front end filter 400 to remove the leading ISI & reshape the channel response as desired. In block 1112, the precompensation unit is provided, exploiting the reshaped channel response and any combined threshold values to achieve reduced complexity via a reduced number of comparators. In block 1114, a recursive selection element, optionally implemented in a parallel fashion, is provided to accept the tentative decisions from the precomputation unit and derive a sequence of received symbols.

Numerous alternative forms, equivalents, and modifications will become apparent to those skilled in the art once the above disclosure is fully appreciated. For example, the various DFE components can be implemented with analog electrical components or with digital electrical components. In many cases, the order of elements can be changed, e.g., performing the precompensation after the serial-to-parallel conversion, though this necessitates multiple precompensation units operating in parallel. As another example, the digitizer may be omitted from the precompensation unit and may be placed if desired after the recursive selection element. It is intended that the claims be interpreted to embrace all such alternative forms, equivalents, and modifications that are encompassed in the scope of the appended claims.

What is claimed is:

1. A method for providing high speed equalization, the method comprising:
   obtaining a channel response that presents trailing inter-symbol interference in a signal having a sequence of symbols from a symbol set;

determining a distribution of threshold values for a precompensation unit corresponding to said channel response with said symbol set;
deriving a reduced set of threshold values from said distribution; and
implementing a decision feedback equalizer with a reduced-complexity precompensation unit employing the reduced set of threshold values.

2. The method of claim 1, wherein said deriving includes:
identifying groups of threshold values within said distribution; and
combining the threshold values in each group to obtain a replacement threshold value for that group.

3. The method of claim 2, wherein said replacement threshold value is an average of the threshold values for that group.

4. The method of claim 2, wherein said replacement threshold value is a center of a range of the threshold values for that group.

5. The method according to claim 2, wherein said identifying groups includes determining a group membership based at least in part on a difference between each threshold value and the replacement threshold value.

6. The method of claim 5, wherein a magnitude of said difference is maintained at or below a predetermined limit.

7. The method of claim 6, wherein the limit is 10% of a minimum interval between symbols in the symbol set.

8. A method for providing high speed equalization, the method comprising:
obtaining a channel response that presents trailing intersymbol interference in a signal having a sequence of symbols from a symbol set, the channel response and symbol set corresponding to an initial distribution of threshold values for a precompensation unit;
deriving a filter that converts the channel response into a modified channel response, the modified channel response and symbol set corresponding to an improved distribution of threshold values in that the improved distribution includes fewer distinct threshold values or reduced spacing between at least some adjacent threshold values; and
implementing a decision feedback equalizer with a reduced-complexity precompensation unit employing the threshold values in the improved distribution.

9. The method of claim 8, wherein the employing includes deriving a reduced set of threshold values from said improved distribution.

10. The method of claim 9, wherein said deriving includes:
identifying groups of threshold values within said improved distribution; and
combining the threshold values in each group to obtain a replacement threshold value for that group.

11. The method of claim 10, wherein said replacement threshold value is an average of the threshold values for that group.

12. The method of claim 10, wherein said replacement threshold value is a center of a range of the threshold values for that group.

13. The method according to claim 10, wherein the obtained channel response has an initial spectrum, and wherein said deriving includes providing a modified channel response spectrum that approximates the initial spectrum.

14. The method according to claim 10, wherein said identifying groups includes determining a group membership based at least in part on a difference between each threshold value and the replacement threshold value.

15. The method of claim 14, wherein a magnitude of said difference is maintained at or below a predetermined limit.

16. The method of claim 15, wherein the limit is 10% of a minimum interval between symbols in the symbol set.

17. A channel interface module that comprises a receiver having:
a front end filter that produces a filtered signal having trailing intersymbol interference in a sequence of symbols from a symbol set, the trailing intersymbol interference and symbol set corresponding to a set of threshold values for a conventional precompensation unit;
at least one reduced-complexity precompensation unit that produces at each of multiple time intervals a set of tentative decisions, thereby providing multiple sets of tentative decisions, each tentative decision accounting for a degree of trailing intersymbol interference from a potential sequence of preceding symbol decisions;
a selection element that selects from the multiple sets of tentative decisions an actual sequence of symbol decisions based on preceding symbol decisions in the actual sequence of symbol decisions; and
a device interface that provides a host node with a received data stream derived from the sequence of symbol decisions.

18. The module of claim 17, wherein the front end filter shapes a spectrum of the filtered signal to provide, relative to the spectrum of an optimally filtered signal, fewer distinct threshold values or reduced spacing between at least some adjacent threshold values in the set.

19. The module of claim 17, wherein the at least one reduced-complexity precompensation unit comprises a single comparator for each threshold value in a reduced set of threshold values, the reduced set having fewer unique threshold values than said set of threshold values for the conventional precompensation unit.

20. The module according to claim 17, wherein the set of threshold values for the conventional precompensation unit includes groups of threshold values, and wherein the at least one reduced-complexity precompensation unit employs a single replacement threshold value for the threshold values in each said group.

21. The module of claim 20, wherein said replacement threshold value is an average of the threshold values for that group.

22. The module of claim 20, wherein said replacement threshold value is a center of a range of the threshold values for that group.

23. The module of claim 17, further comprising a sensor that converts a channel signal into a receive signal, wherein the channel signal is an optical signal, and wherein the front end filter produces the filtered signal in response to the receive signal.

24. The module of claim 17, further comprising a sensor that converts a channel signal into a receive signal, wherein the channel is an information storage medium, and wherein the front end filter produces the filtered signal in response to the receive signal.

25. The module of claim 17, further comprising a sensor that converts a channel signal into a receive signal, wherein the channel signal is an electromagnetic signal conveyed via twisted wire pair, coaxial cable, or backplane transmission lines, and wherein the front end filter produces the filtered signal in response to the receive signal.

26. The module of claim 17, further comprising a forward error correction decoder that derives the received data stream from the sequence of symbol decisions.

* * * * *